Patented Feb. 19, 1946

2,394,998

UNITED STATES PATENT OFFICE 2,394,998

METALLIZABLE STILBENE TRIAZOLE AZO COMPOUNDS

Ernst Keller, Basel, Switzerland, assignor to J. R. Geigy A. G., Basel, Switzerland, a Swiss firm No Drawing. Application August 31, 1942, Serial No. 456,818. In Switzerland November 5, 1941

13 Claims. (Cl. 260—146)

It has been found that new valuable dyestuffs are obtained by condensing amino azo dyestuffs or their copper compounds respectively of the general formula

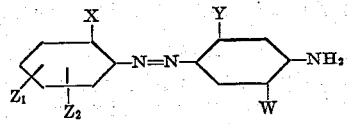

wherein W means hydrogen, a methyl or alkoxy group, X means a hydroxyl or carboxylic group, Y means a hydroxyl, an —O.CH$_2$—COOH or an alkoxy group, $Z_1$ means hydrogen or a sulfonic acid group and $Z_2$ means hydrogen, halogen or the nitro group, in an alkaline solution with triazoles of the general formula

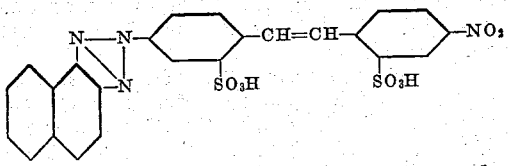

The two benzene nuclei of the amino azo dyestuff may also be further substituted. For the production of the amino azo dyestuffs according to the above formula the following diazo components may be mentioned: 2-amino-1-hydroxybenzene-4-sulfonic acid, 4-chloro-2-amino-1-hydroxybenzene-6-sulfonic acid, 4-chloro-2-amino-1-hydroxybenzene-5-sulfonic acid, 6-chloro-2-amino-1-hydroxybenzene-4-sulfonic acid, 2-aminobenzoic acid, 5-nitro-2-aminobenzoic acid, 4-chloro-2-aminophenol, 4-nitro-2-aminophenol, 5-nitro-2-aminophenol and the like. As coupling components, use may be made of: m-aminophenol, m-anisidine, m-ethoxy-, propyloxy- or butoxy-aminobenzene, 2-amino-4-hydroxytoluene, 1-amino-2-methyl-5-methoxybenzene, 2:5-dimethoxyaniline, 3-amino-phenoxy acetic acid and many other ones.

The triazoles may still be specially substituted in the naphthalene nucleus by sulfonic acid or carboxylic acid groups. The manufacture of these compounds takes place according to known methods, e. g. by treating coupling products which are obtainable from diazotized 4-nitro-4'-aminostilbene-2:2'-disulfonic acid with naphthylamine derivatives coupling in o-position to the amino group, with oxidation agents, such as chlorine, sodium hypochlorite, cupric salts and so on.

The condensation is effected according to the methods known for the production of stilbene dyestuffs in the presence of caustic alkalies with or without pressure. The condensation products can be after-treated with oxidizing or metal-yielding agents; moreover, as is known, the copper compounds of the amino azo dyestuffs may be brought to condensation.

The present invention will be illustrated hereinafter by the following examples, the parts being by weight.

Example 1

63.2 parts of the triazole, obtainable by oxidizing the coupling product from diazotized 4-nitro-4'-aminostilbene-2:2'-disulfonic acid and 2-naphthylamine-6-sulfonic acid, and 35 parts of the aminoazo dyestuff, made by coupling diazotized 2-amino-1-hydroxybenzene-4-sulfonic acid with 2:5-dimethoxyaniline, are heated to boiling under reflux in a stirring vessel with 600 parts of water and 100 parts of caustic soda lye of 36° Bé. for 12 to 15 hours. After cooling down the whole mixture is neutralized with hydrochloric acid, then the condensation product is completely precipitated by means of sodium chloride and filtered.

The copper compound of the dyestuff is obtained for instance by treating the dyestuff in 1500 parts of water at 80°–90° C. with a solution of 25 parts of crystallized copper sulfate in 100 parts of water and 60 parts of ammonia of 25% strength and stirring this mixture at this temperature for 10 to 12 hours. The metallized compound is isolated in the usual manner. For metallizing the neutralized solution of the condensation product can be used directly.

The dried metallized dyestuff constitutes a black powder which dissolves in water with an olive coloration, but in concentrated sulfuric acid with a blackish-violet coloration and dyes cellulose fibres in very light-fast, olive shades.

When the metallized dyestuff is dissolved in 1200 parts of water and 40 parts of caustic soda lye of 36° Bé. and stirred at 60°–70° C. for 2 hours with 150 parts of sodium hypochlorite (10–12% active chlorine), a product of similar fastness properties is obtained dyeing cellulose fibre in purer olive shades.

A further similar dyestuff is produced by replacing in the above example the 2-amino-1-hydroxybenzene-4-sulfonic acid by the 6-chloro-2-amino-1-hydroxybenzene-4-sulfonic acid.

Example 2

63.2 parts of the triazole described in Example 1 and 38 parts of the copper compound of the amino azo dyestuff from diazotized 2-amino-1-hydroxybenzene-4-sulfonic acid and m-anisidine are condensed in the usual manner at boiling temperature for 10 to 12 hours with 800 parts of water and 120 parts of caustic soda lye of 36° Bé. After cooling down the whole is neutralized with hydrochloric acid, until a weak alkaline reaction is reached, and the condensation product is then completely precipitated by means of sodium chloride and filtered.

The dried copper-containing dyestuff is a dark brown powder; it dissolves in water with a reddish-brown coloration, in concentrated sulfuric acid with a blue coloration and dyes cellulose fibres in light-fast reddish brown shades.

If in the above example, instead of the copper compound, the non-metallized amino azo dyestuff is condensed under the same conditions and the condensation product is, for example, converted into the copper compound, as described in Example 1, a similar dyestuff is obtained dyeing cellulose fibres in somewhat more bluish brown shades.

A further similar dyestuff is obtained, when the triazole described in Example 1 is replaced by the triazole obtainable by the oxidation of the coupling product of the diazotized 4-nitro-4'-aminostilbene disulfonic acid with 2-naphthylamine.

Example 3

63.2 parts of the triazole, described in Example 1, and 22 parts of the amino azo dyestuff from 1-hydroxy-2-amino-4-chlorobenzene and m-anisidine are condensed in the usual way with 900 parts of water and 300 parts of caustic soda lye of 36° Bé., e. g. as described in Example 1, and then converted into the copper compound.

The metallized dyestuff constitutes an almost black powder which dissolves in water with a brown coloration, in concentrated sulfuric acid with a blue coloration and dyes cotton in light-fast dark brown shades.

A dyestuff with nearly the same properties is obtained, when, instead of condensing in an open vessel, the condensation is effected for 8 to 10 hours under reflux in a pressure vessel at 110°–120° C. and the copper compound of the dyestuff is produced in the usual manner.

A further similar dyestuff is produced, when the triazole, described in this example, is replaced by 71 parts of the triazole made by oxidation of the coupling product from diazotized 4-nitro-4'-aminostilbene disulfonic acid with 2-naphthylamine-5:7-disulfonic acid.

Example 4

63 parts of the triazole described in Example 1 and the amino azo dyestuff, obtained by coupling 15.4 parts of the diazotized 1-hydroxy-2-amino-4-nitrobenzene and 12.3 parts of m-anisidine, are condensed under reflux during 14 to 16 hours at boiling temperature with 800 parts of water and 200 parts of caustic soda lye of 36° Bé. and worked up in the usual manner.

The dyestuff is a brown powder; it dissolves in water with a brown coloration, in concentrated sulfuric acid with blue coloration and dyes cellulose fibres, when after-treated with copper sulfate, in brown-red shades of light- and water-fastness.

The dyestuff may also be converted in substance into the copper compound; the same dyes cellulose fibres in light-fast brown shades.

Example 5

60 parts of the triazole, made by oxidation of the coupling product from diazotized 4-nitro-4'-aminostilbene disulfonic acid with 2-aminonaphthalene-3-carboxylic acid, and 35 parts of the amino azo dyestuff, made by coupling diazotized 2-amino-1-hydroxybenzene-4-sulfonic acid with 2:5-dimethoxyaniline, are condensed under reflux at boiling temperature during 14 to 16 hours or in the pressure vessel in 700 parts of water and 100 parts of caustic soda lye of 36° Bé. and converted into the copper compound in the usual way.

The dried copper compound of the dyestuff constitutes an almost black powder; it dissolves in water with an olive coloration, in concentrated sulfuric acid with a blackish-violet coloration and dyes cellulose fibres in light-fast olive shades.

In the following table a certain number of further dyestuffs obtainable according to the present invention is enumerated:

| Amino azo dyestuff | | Triazole | Coloration of the copper dyeing on cellulose fibres |
|---|---|---|---|
| Diazo component | Coupling component | | |
| 2-amino-1-hydroxybenzene-4-sulfonic acid | 2:5-dimethoxyaniline | No. 1 | Bronze. |
| 4-chloro-2-amino-1-hydroxybenzene | m-anisidine | No. 1 | Brown. |
| 6-chloro-2-amino-1-hydroxybenzene-4-sulfonic acid | do | No. 1 | Do. |
| 4-nitro-2-amino-1-hydroxybenzene | 2:5-dimethoxyaniline | No. 2 | Bronze. |
| 4-chloro-2-amino-1-hydroxybenzene | do | No. 2 | Do. |
| 4-nitro-2-amino-1-hydroxybenzene | 2-amino-4-hydroxytoluene | No. 2 | Yellow-brown. |
| 6-chloro-2-amino-1-hydroxybenzene-4-sulfonic acid | 2:5-dimethoxyaniline | No. 2 | Olive. |
| 2-amino-5-nitro-benzoic acid | m-anisidine | No. 2 | Brown. |
| Anthranilic acid | 2-amino-4-hydroxytoluene | No. 2 | Orange. |
| 2-amino-1-hydroxybenzene-4-sulfamide | m-anisidine | No. 2 | Brown. |
| Do | 2:5-dimethoxyaniline | No. 2 | Bronze. |
| 4-nitro-2-amino-1-hydroxybenzene | 3-aminophenoxy acetic acid | No. 2 | Yellow-brown. |
| 2-amino-1-hydroxybenzene-4-sulfonic acid | 2:5-dimethoxyaniline | No. 3 | Olive. |
| 6-chloro-2-amino-1-hydroxybenzene-4-sulfonic acid | do | No. 3 | Do. |
| 4-chloro-2-amino-1-hydroxybenzene | m-anisidine | No. 4 | Brown. |
| 2-amino-1-hydroxybenzene-4-sulfonic acid | do | No. 4 | Do. |
| Do | 2:5-dimethoxyaniline | No. 4 | Olive. |
| 4-chloro-2-amino-1-hydroxybenzene | 2:5-dimethoxyaniline | No. 5 | Brown. |
| 4-nitro-2-amino-1-hydroxybenzene | do | No. 5 | Bronze. |
| 2-amino-1-hydroxybenzene-4-sulfonic acid | m-anisidine | No. 6 | Brown. |
| 6-chloro-2-amino-1-hydroxybenzene-4-sulfonic acid | 2:5-dimethoxyaniline | No. 6 | Olive. |

Supposed formulae of the triazoles No. 1–6:

No. 1
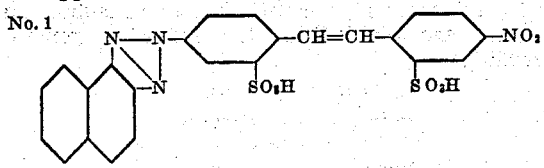

No. 2
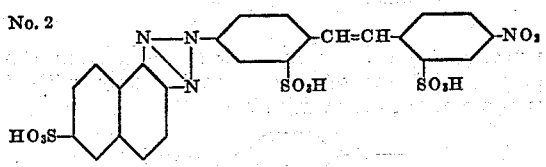

No. 3
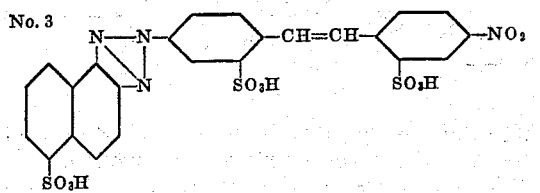

No. 4
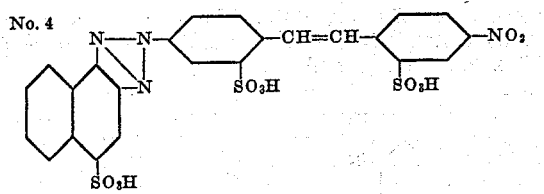

No. 5
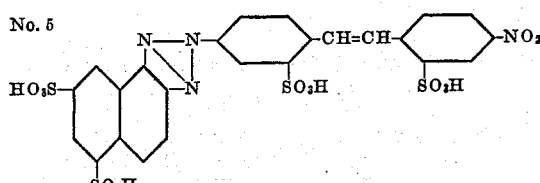

No. 6
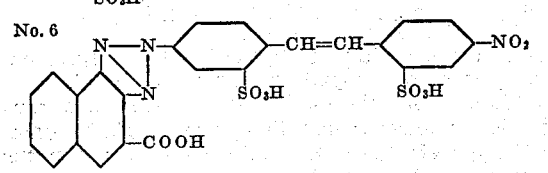

Instead of the diazo and coupling components mentioned in the above examples and table, the other compounds enumerated in the general part of this specification can be used quite well for the formation of the monoazo dyestuff.

What I claim is:

1. The copper compound of a dyestuff obtained by condensing in a caustic alkaline medium an amino azo dyestuff of the following general formula

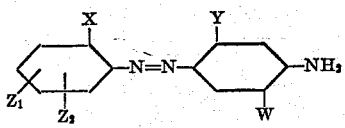

wherein X means a member selected from the group consisting of OH and COOH, Y means a member selected from the group consisting of OH, OCH₂COOH, and alkoxy groups, W means a member selected from the group consisting of H, CH₃ and alkoxy, Z₁ means one of H and SO₃H and Z₂ means one of H, Cl and NO₂, with a triazole of the following general formula

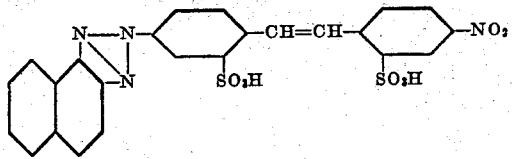

the naphthalene nucleus thereof being substituted by substituents selected from the group consisting of H, SO₃H and COOH.

2. The copper compound of a dyestuff obtained by condensing in a caustic alkaline medium an amino azo dyestuff of the following general formula

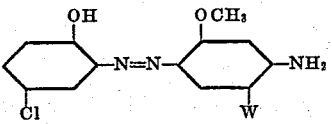

wherein W means a member selected from the group consisting of H, CH₃ and alkoxy with a triazole of the following formula

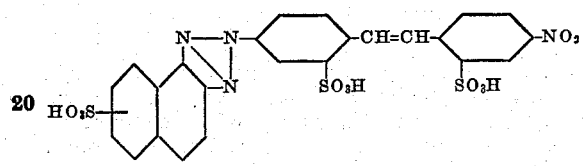

3. The copper compound of a dyestuff obtained by condensing in a caustic alkaline medium an amino azo dyestuff of the following general formula

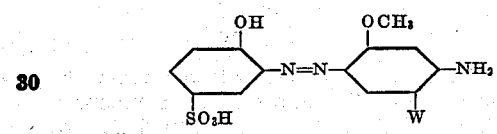

wherein W means a member selected from the group consisting of H, CH₃ and alkoxy, with a triazole of the following formula

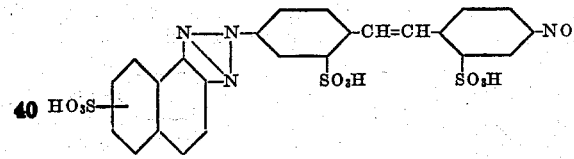

4. The copper compound of a dyestuff obtained by condensing in a caustic alkaline medium the triazole of the formula

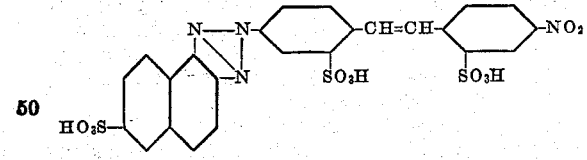

with the amino azo dyestuff of the formula

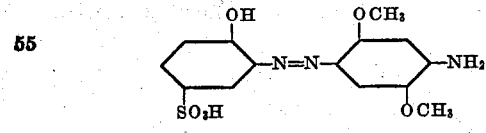

5. The copper compound of a dyestuff obtained by condensing in a caustic alkaline medium the triazole of the formula

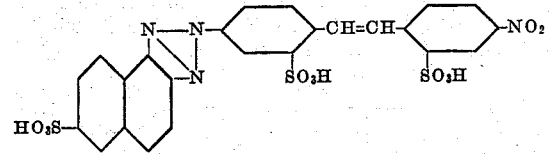

with the amino azo dyestuff of the formula

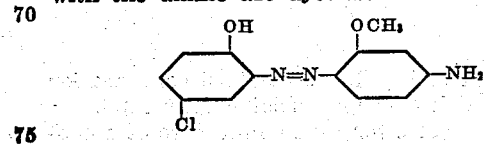

6. The copper compound of a dyestuff obtained by condensing in a caustic alkaline medium the triazole of the formula

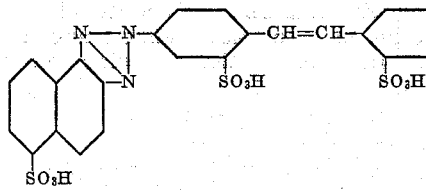

with the amino azo dyestuff of the formula

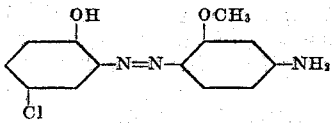

7. In a process for the manufacture of a copper compound of a metallizable dyestuff, the steps of condensing in a caustic alkaline medium an amino azo dyestuff of the following general formula

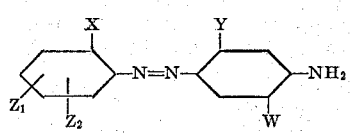

wherein X means a member selected from the group consisting of OH and COOH, Y means a member selected from the group consisting of OH, OCH$_2$COOH, and alkoxy groups, W means a member selected from the group consisting of H, CH$_3$ and alkoxy, Z$_1$ means one of H and SO$_3$H and Z$_2$ means one of H, Cl and NO$_2$, with a triazole of the following general formula

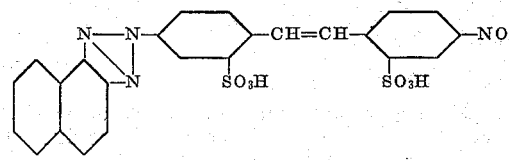

the naphthalene nucleus thereof being substituted by substituents selected from the group consisting of H, SO$_3$H and COOH, and after-treating the so-obtained condensation products with a copper-yielding compound.

8. In a process for the manufacture of a copper compound of a metallizable dyestuff, the steps of condensing in a caustic alkaline medium an amino azo dyestuff of the following general formula

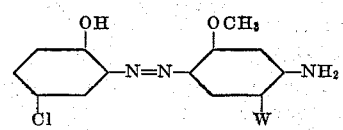

wherein W means a member selected from the group consisting of H, CH$_3$ and alkoxy, with a triazole of the following formula

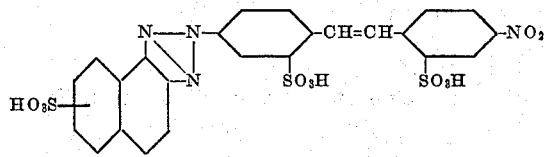

and after-treating the so-obtained condensation products with a copper-yielding compound.

9. In a process for the manufacture of a copper compound of a metallizable dyestuff, the steps of condensing in a caustic alkaline medium an amino azo dyestuff of the following general formula

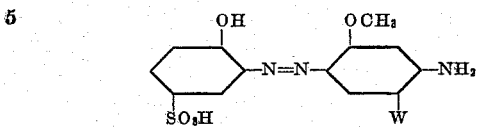

wherein W means a member selected from the group consisting of C, CH$_3$ and alkoxy, with a triazole of the following formula

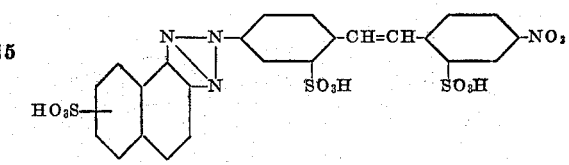

and after-treating the so-obtained condensation products with a copper-yielding compound.

10. In a process for the manufacture of a copper compound of a metallizable dyestuff, the steps of condensing in a caustic alkaline medium the triazole of the formula

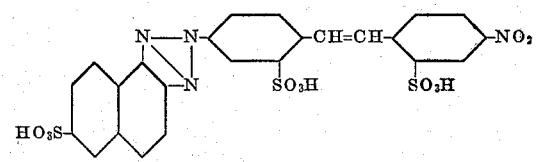

with the amino azo dyestuff of the formula

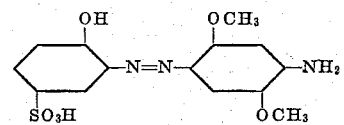

and after-treating the so-obtained condensation product with a copper-yielding compound.

11. In a process for the manufacture of a copper compound of a metallizable dyestuff, the steps of condensing in a caustic alkaline medium the triazole of the formula

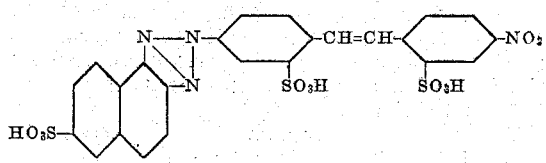

with the amino azo dyestuff of the formula

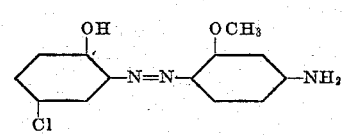

and after-treating the so-obtained condensation product with a copper-yielding compound.

12. In a process for the manufacture of a copper compound of a metallizable dyestuff, the steps of condensing in a caustic alkaline medium the triazole of the formula

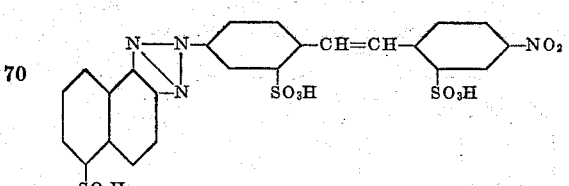

with the amino azo dyestuff of the formula

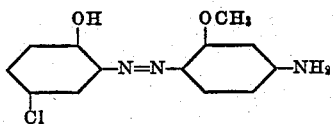

and after-treating the so-obtained condensation product with a copper-yielding compound.

13. In a process for the manufacture of a copper compound of a metallizable dyestuff, the step of condensing in a caustic alkaline medium a member selected from the class consisting of an amino azo dyestuff of the formula

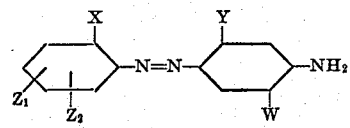

and a copper compound of the said amino azo dyestuff, with a triazole of the formula

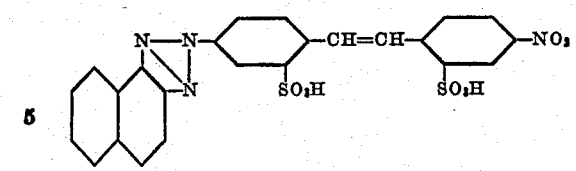

wherein the naphthalene nucleus is substituted by substituents selected from the class consisting of H, $SO_3H$ and COOH, to produce a condensation product, W in the first-named formula representing a member selected from the group consisting of H, $CH_3$ and alkoxy, X representing a member selected from the group consisting of OH and COOH, Y representing a member selected from the group consisting of OH, $OCH_2COOH$ and alkoxy, $Z_1$ representing a member selected from the group consisting of H and $SO_3H$, and $Z_2$ representing a member selected from the group consisting of H, Cl and $NO_2$.

ERNST KELLER.